United States Patent [19]
Binns

[11] Patent Number: 5,134,485
[45] Date of Patent: Jul. 28, 1992

[54] TELEVISION TRANSMITTER HAVING AMPLIFICATION MODULES IN WHICH ONE COMPONENT OF R.F. SIGNAL IS OBTAINED BY MODULATING ANOTHER COMPONENT AND THE R.F. SIGNAL COMPONENTS ARE COMBINED AFTER AMPLIFICATION

[75] Inventor: John F. H. Binns, Chelmsford, United Kingdom

[73] Assignee: The Marconi Company Limited, Stanmore, United Kingdom

[21] Appl. No.: 589,009

[22] Filed: Sep. 27, 1990

[30] Foreign Application Priority Data

Oct. 3, 1989 [GB] United Kingdom ............... 8922277

[51] Int. Cl.⁵ .............................................. H04N 5/38
[52] U.S. Cl. ................................................ 358/186
[58] Field of Search ................ 358/141, 148, 186, 149

[56] References Cited

U.S. PATENT DOCUMENTS 4,263,617 4/1981 Chemin et al. ..................... 358/186

FOREIGN PATENT DOCUMENTS 2223626 4/1990 United Kingdom .

Primary Examiner—Victor R. Kostak
Attorney, Agent, or Firm—Spencer, Frank & Schneider

[57] ABSTRACT

In a television transmitter having separate picture- and sync-modulated r.f. amplification, the sync-modulated r.f. signal is derived from the picture-modulated signal using a modulator controlled by the video sync signal conventionally present in the transmitter. This simplifies the construction of the transmitter, and is particularly applicable to solid-state amplifier transmitters.

9 Claims, 3 Drawing Sheets

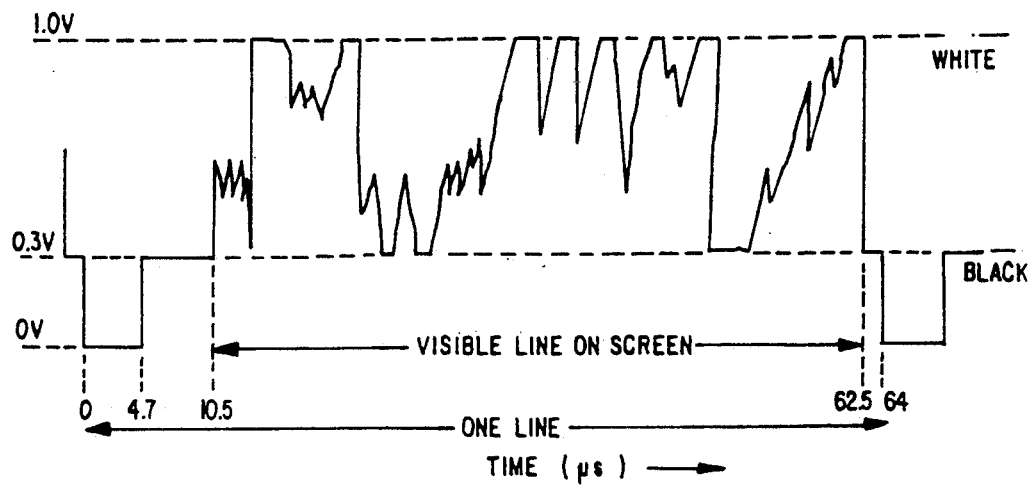
FIG. 1
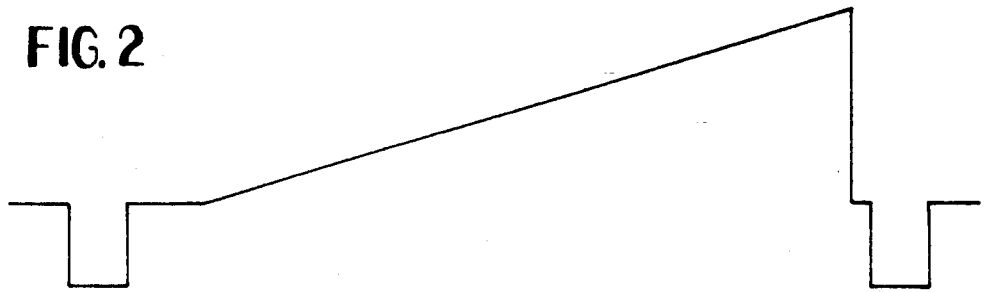
FIG. 2
FIG. 3
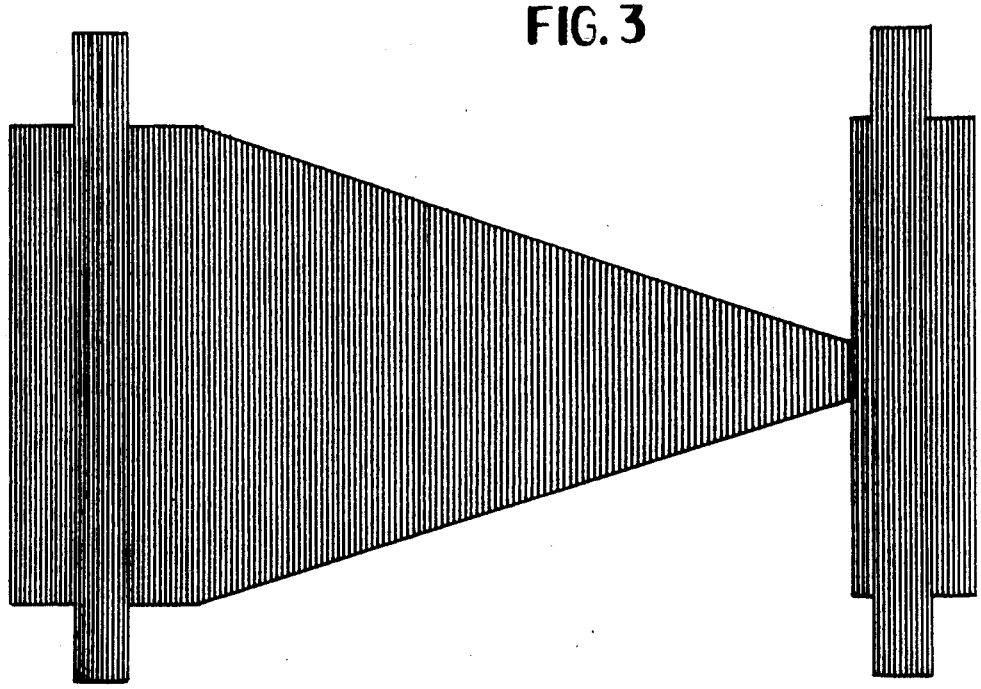

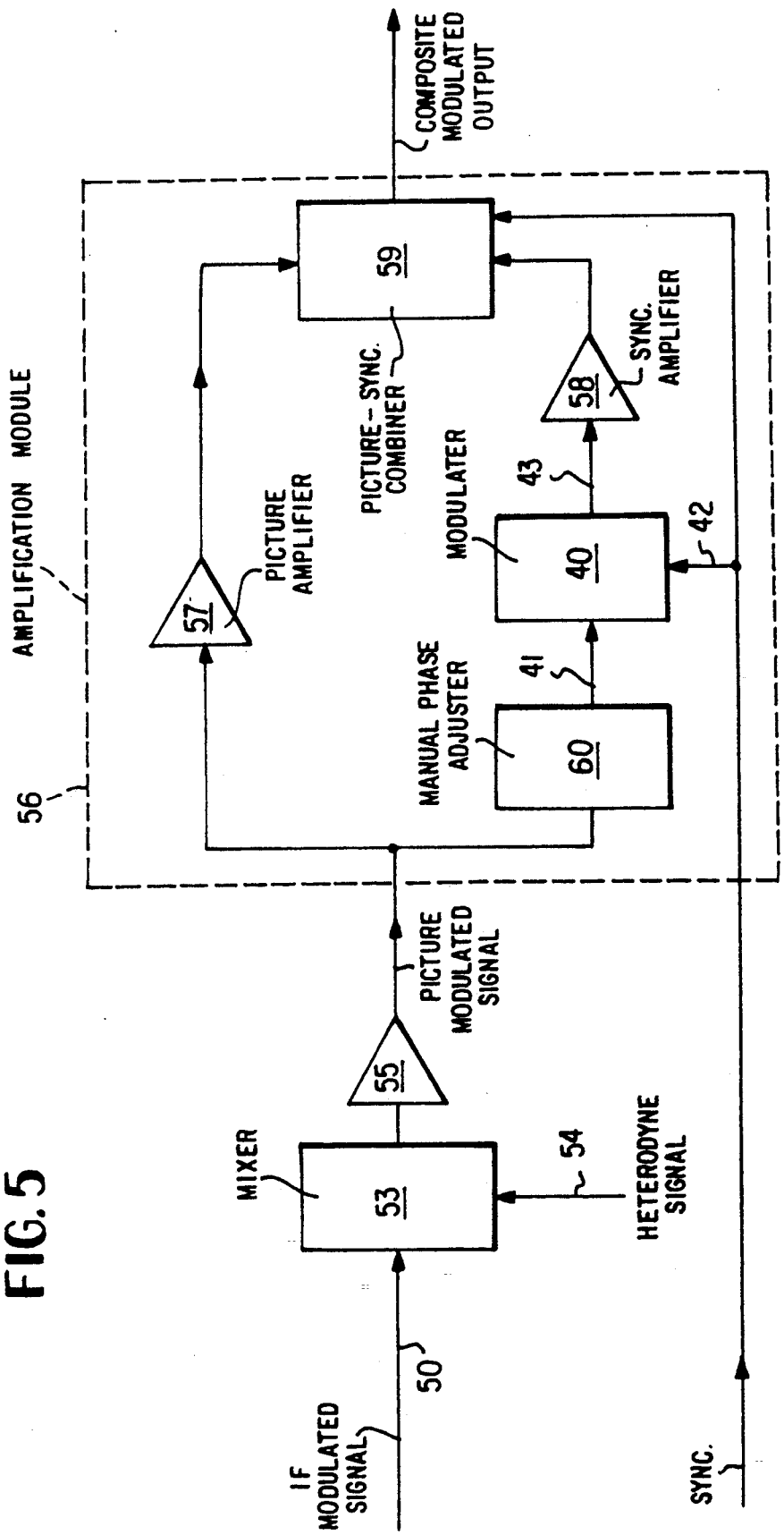

TELEVISION TRANSMITTER HAVING AMPLIFICATION MODULES IN WHICH ONE COMPONENT OF R.F. SIGNAL IS OBTAINED BY MODULATING ANOTHER COMPONENT AND THE R.F. SIGNAL COMPONENTS ARE COMBINED AFTER AMPLIFICATION

BACKGROUND OF THE INVENTION

This invention relates to a television transmitter.

Conventional modern television transmitters carry out vision modulation at an intermediate frequency (i.f.) which is typically 38.9 MHz. This modulation process is generally combined with filtering to provide the "vestigial side band" characteristic adopted by virtually all terrestrial T.V. broadcasting.

A television receiver takes analogue amplitude modulated vision signals which provide the picture information and synchronising information to ensure that the displayed luminance and chrominance information appear in the right place on the television screen. The picture and synchronisation information are separate at some points in the chain between the televison camera and the television receiver, but appear as a composite wave form generally when being transferred from one place to another. A standard video waveform as presented to a transmitter in a U.K. P.A.L. system, usually as a one volt signal, is illustrated in FIG. 1, which shows a typical line where the luminance level varies between black and white a number of times between the left and right sides of the picture display. For convenience, a test wave form will be considered, being a line saw tooth, changing linearly between black at the left of the screen and white at the right, as shown in FIG. 2. For the sake of simplicity, FIG. 2 ignores the chrominance information and the vertical synchronisation. The radio frequency envelope broadcast by a television transmitter, corresponding to the test waveform shown in FIG. 2, is illustrated by FIG. 3.

In a conventional transmitter, the radio frequency envelope of this form is amplified to the necessary power level. To avoid distortion of the modulation envelope, linear amplifiers are required. Such amplifiers are typically class AB to attain as high an efficiency as possible. The amplifier must be capable of handling the sync pulse power, which it will be seen from FIG. 3 represents a fairly short pulse of much higher power than the rest of the signal. Because of this, some efficiency in amplification is lost for the greater part of the signal in allowing for the sync. pulse.

In UK Published Patent Application No. 2223626 there is disclosed and claimed a television transmitter in which separate picture signal and synchronisation pulse modulation of the r.f. carrier is followed by separate amplification for the modulated carrier signals, which are then combined in a signal combining device as specified in the claims in said application. Thus, when such a transmitter includes solid state amplification both of the separately modulated signals required a multi-way splitter so that the signal can be divided equally between a number of amplifiers in parallel, each solid state amplifier being of limited power.

SUMMARY OF INVENTION

According to the invention, a television transmitter includes an r.f. amplification circuit comprising a picture-modulated r.f. signal input connected to a picture-modulated signal amplifier and to a modulator, the modulator having a video synchronisation pulse signal input and being arranged to modulate the picture-modulated signal in accordance with the video synchronisation pulse signal to produce a synchronisation pulse-modulated r.f. signal, an amplifier for the synchronisation pulse-modulated r.f. signal, and a combining network to combine the amplified picture- and synchronisation pulse-modulated signals to provide a circuit output.

Preferably the transmitter comprises a picture-signal r.f. modulator, a signal-splitting network connected to the output of said modulator and having a plurality of signal outputs between which the output from the modulator is split equally, a plurality of said r.f. amplification circuits, each having the picture-modulated r.f. signal input thereof connected to a respective one of the outputs of the signal-splitting network, and a signal-combining network for combining the circuit outputs from the plurality of r.f. amplification circuits.

The or each r.f. amplification circuit may include means for shifting the phase of the picture-modulated r.f. signal or the synchronisation pulse-modulated r.f. signal to ensure that signals are in phase at the input to the combining network in said circuit.

Although the signal output from the modulator is likely to include vestiges of the picture signal due to imperfections in the modulator, these will be removed by the use of a class C amplifier to amplify the sync-modulated signal. This is because the amplitude of the picture signal vestiges will be to small too drive the class C amplifier into conduction.

A transmitter in accordance with the present invention contains fewer linear amplifier devices than a conventional transmitter, thereby saving in capital cost. It will also permit a significant reduction in power consumption.

BRIEF DESCRIPTION OF THE DRAWINGS

FIG. 1 is a graphical representation of a standard video waveform representing a typical line of a 625 line, 25 frame per second, TV picture;

FIG. 2 is a representation of a line saw tooth test waveform;

FIG. 3 is a representation of the radio frequency envelope as broadcast by a television transmitter, corresponding to the test waveform shown in FIG. 2;

FIG. 5 illustrates the r.f. stages of a television transmitter in accordance with the invention.

DESCRIPTION OF THE PREFERRED EMBODIMENT

Figure 4:
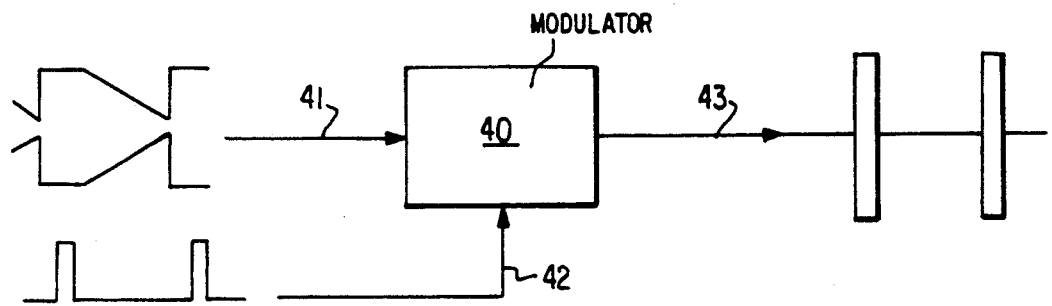
FIG. 4 illustrates a modulator forming a part of a television transmitter in accordance with the invention.

Referring to FIG. 4, the invention makes use of the fact that a modulator 40, used to produce the sync-modulated r.f., is only concerned with the r.f. input for the period of time when a modulated sync pulse output is needed. A picture-modulated r.f. signal is input on line 41, while the corresponding video sync pulse signal is input on line 42. At the period when a sync pulse is required, the picture signal is always at black and so switching on the modulator at this point produces a pulse of peak power, the remainder of the picture waveform being substantially blocked. The resulting signal on line 43 is thus simply the sync pulse-modulated r.f. signal. The modulator 40 is conveniently a modulated low level amplifier of conventional form.

FIG. 5 shows the application of this arrangement in the r.f. stages of a television transmitter. The picture-modulated intermediate frequency signal is supplied via line 50 to a mixer 53 which is supplied with a heterodyne signal input on line 54 and which gives an output of a picture-modulated r.f. signal at the desired frequency. The signal is then passed via an amplifier 55 to an amplification module 56 enclosed in the figure by a broken line.

The amplification module 56 has separate picture-modulated signal and synchronisation pulse-modulated signal amplifiers 57 and 58 respectively, whose outputs are combined in a combiner network 59, for example of the type described in UK Published Application No. 2223626. The signal output by the amplifier 55 is split so that part is fed to the picture amplifier 57 and part to a manual phase adjuster 60 which is used to ensure a correct phase relationship between the two signals reaching the combiner 59. The adjusted signal from the adjuster 60 passes via line 41 to the modulator 40 as described with reference to FIG. 4. The output from the modulator 40 is a synchronisation pulse-modulated r.f. signal on line 43 which is then amplified in the synchronisation pulse-modulated amplifier 58.

Figure 6:
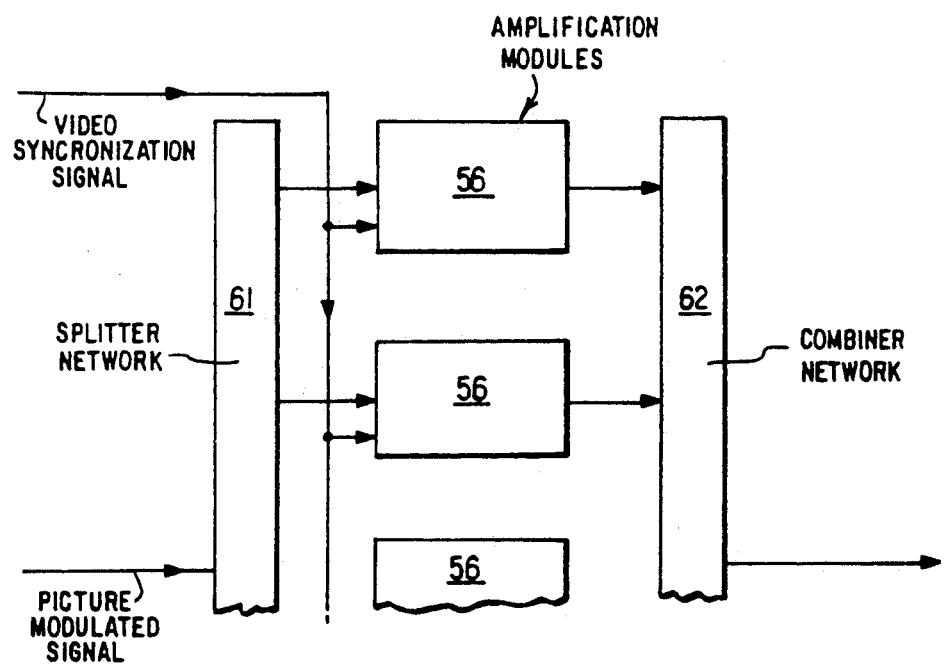
FIG. 6 illustrates the solid state r.f. amplification stages of a television transmitter according to a preferred embodiment of the invention.

A plurality of the amplification modules 56 described with reference to FIG. 5 may be used in a solid state TV transmitter in the manner shown in FIG. 6. The picture-modulated r.f. signal, for example that emerging from the amplifier 55 shown in FIG. 5, is fed to multiway splitter network 61 which splits the signal between a plurality of the modules 56, the number depending upon the power handling capability of the transistor amplifiers used in the modules and the desired output power. Each module is also supplied with a video synchronisation signal input. The outputs from the module 56 are then combined in a multiway combiner network 62. The splitter and combiner networks 61 and 62 may be of the types used in known transmitters, the design of the combiner being relatively straightforward since all the inputs are substantially identical.

I claim:

1. A television transmitter including an r.f. amplification circuit comprising a picture-modulated r.f. signal input connected to a picture-modulated signal amplifier and to a modulator, the modulator having a video synchronisation pulse signal input and being arranged to modulate the picture-modulated signal in accordance with the video synchronisation pulse signal to produce a synchronisation pulse-modulated r.f. signal, an amplifier for said synchronisation pulse-modulated r.f. signal, and a combining network to combine said amplified picture and synchronisation pulse-modulated signals to provide a circuit output.

2. A television transmitter according to claim 1 comprising a picture-signal r.f. modulator, a signal-splitting network connected to the output of said modulator and having a plurality of signal outputs between which the output from the modulator is split equally, a plurality of said r.f. amplification circuits, each having the picture-modulated r.f. signal input thereof connected to a respective one of the outputs of the signal-splitting network, and a signal-combining network for combining the circuit outputs from the plurality of r.f. amplification circuits.

3. A television transmitter according to claim 1 wherein said r.f. amplification circuit includes means for shifting the phase of the picture-modulated r.f. signal to ensure that signals are in phase at the input to said combining network in said circuit.

4. A television transmitter, comprising:
an amplification module having a first input port for receiving a picture-modulated r.f. signal, a second input port for receiving a synchronization pulse signal, and an output port, the amplification module including
first amplifier means for amplifying the signal received at the first port to provide an amplified picture-modulated r.f. signal,
modulator means for modulating the signal received at the first port in accordance with the signal received at the second port to provide a synchronization pulse-modulated r.f. signal,
second amplifier means for amplifying the synchronization pulse-modulated r.f. signal to provide an amplified synchronization pulse-modulated r.f. signal, and
means for combining the amplified picture-modulated r.f. signal and the amplified synchronization pulse-modulated r.f. signal to provide a combined r.f. signal, the combined r.f. signal being conveyed to the output port of the amplification module.

5. The television transmitter of claim 4, wherein the amplification module additionally includes phase adjustment means, connected to the first input port of the amplification module, for causing a phase difference between the r.f. signals received by the first amplifier means and the modulator means.

6. The television transmitter of claim 5, wherein the phase adjustment means is manually adjustable.

7. The television transmitter of claim 4, wherein the amplification module additionally includes a phase adjustor connected to the modulator means.

8. The television transmitter of claim 7, wherein the phase adjustor is manually variable.

9. The television transmitter of claim 4, further comprising:
at least one additional amplification module having first and second input ports and having an output port, the second input ports of the amplification modules being connected together;
a multiway splitter network having an input port which receives a picture-modulated r.f. signal and having a plurlaity of output ports, each output port of the multiway splitter network being connected to the first input port of a respective amplification module; and
a multiway combiner network having a plurality of input ports, each of which is connected to the output port of a respective amplification module.

* * * * *